(12) United States Patent
Khorram et al.

(10) Patent No.: US 9,408,015 B2
(45) Date of Patent: Aug. 2, 2016

(54) REDUCING RECEIVER PERFORMANCE DEGRADATION DUE TO FREQUENCY COEXISTENCE

(71) Applicant: Broadcom Corporation, Irvine, CA (US)

(72) Inventors: Shahla Khorram, Irvine, CA (US); Fazal Haq, Irvine, CA (US); Thomas Francis Baker, Monarch Beach, CA (US); Bojko Frederik Marholev, Lomma (SE); Razieh Roufoogaran, Santa Monica, CA (US)

(73) Assignee: Broadcom Corporation, Irvine, CA (US)

( * ) Notice: Subject to any disclaimer, the term of this patent is extended or adjusted under 35 U.S.C. 154(b) by 357 days.

(21) Appl. No.: 13/902,676

(22) Filed: May 24, 2013

(65) Prior Publication Data
US 2014/0329462 A1    Nov. 6, 2014

Related U.S. Application Data

(60) Provisional application No. 61/820,084, filed on May 6, 2013.

(51) Int. Cl.
*H04B 1/16* (2006.01)
*H04W 52/02* (2009.01)
*H04B 1/10* (2006.01)
*H04W 4/00* (2009.01)

(52) U.S. Cl.
CPC .............. *H04W 4/008* (2013.01); *H04B 1/109* (2013.01); *H04B 1/1036* (2013.01); *H04B 1/16* (2013.01); *H04W 52/0203* (2013.01); *H04B 2001/1063* (2013.01)

(58) Field of Classification Search
CPC ..... H04W 88/06; H04B 15/00; H04B 1/1036; H04B 1/109; H04B 2001/1063
See application file for complete search history.

(56) References Cited

U.S. PATENT DOCUMENTS

| 8,116,706 | B1* | 2/2012 | Clement et al. ............ 455/179.1 |
| 2004/0116074 | A1* | 6/2004 | Fujii et al. .................... 455/41.2 |
| 2006/0079194 | A1* | 4/2006 | Tired et al. ..................... 455/283 |
| 2006/0208791 | A1* | 9/2006 | Vilhonen ....................... 327/551 |
| 2007/0030116 | A1* | 2/2007 | Feher ............................ 340/5.53 |
| 2008/0009258 | A1* | 1/2008 | Safarian et al. .............. 455/307 |
| 2008/0057885 | A1* | 3/2008 | Rofougaran .................. 455/137 |
| 2008/0079541 | A1* | 4/2008 | Rofougaran ................. 340/10.1 |
| 2008/0080597 | A1* | 4/2008 | Rofougaran .................. 375/219 |
| 2008/0125058 | A1 | 5/2008 | Rofougaran |
| 2008/0233867 | A1* | 9/2008 | Rofougaran et al. ........ 455/41.1 |
| 2008/0233880 | A1* | 9/2008 | Rofougaran ............ H03F 3/211  455/42 |
| 2008/0238626 | A1* | 10/2008 | Rofougaran et al. ........ 340/10.1 |
| 2009/0061790 | A1* | 3/2009 | Rofougaran .................... 455/75 |

(Continued)

*Primary Examiner* — Bobbak Safaipour
*Assistant Examiner* — Devan Sandiford
(74) *Attorney, Agent, or Firm* — McDermott Will & Emery LLP (57) ABSTRACT

Systems and apparatuses are provided for negating the degradation effects of fundamental coupling between at least two near field communication (NFC) enabled devices, at least one of which can receive frequency modulation (FM) signals. Due to the fundamental coupling, strong NFC signals can mix with blocking signals associated with a desired/tuned-to FM frequency causing degradation in FM receiver performance. By utilizing a notch filter at the front end of the FM receiver, the degradation in FM receiver performance caused by the fundamental coupling phenomenon can be avoided.

16 Claims, 6 Drawing Sheets

(56) References Cited

U.S. PATENT DOCUMENTS

| | | | |
|---|---|---|---|
| 2009/0325521 A1* | 12/2009 | Dubash | H04B 1/28 455/150.1 |
| 2010/0026547 A1* | 2/2010 | Weissman et al. | 342/16 |
| 2010/0222010 A1* | 9/2010 | Ozaki | H02J 5/005 455/77 |
| 2010/0279734 A1* | 11/2010 | Karkinen et al. | 455/554.2 |
| 2010/0304770 A1* | 12/2010 | Wietfeldt et al. | 455/509 |
| 2011/0009161 A1* | 1/2011 | Trikha | H04B 1/1036 455/552.1 |
| 2011/0098008 A1* | 4/2011 | Zhao et al. | 455/77 |
| 2011/0287714 A1 | 11/2011 | Wilson et al. | |
| 2012/0249270 A1* | 10/2012 | Li et al. | 334/78 |
| 2012/0302188 A1* | 11/2012 | Sahota et al. | 455/150.1 |
| 2013/0023223 A1 | 1/2013 | Rofougaran et al. | |
| 2013/0081261 A1 | 4/2013 | Pienkowski | |
| 2013/0109433 A1* | 5/2013 | Wang et al. | 455/552.1 |
| 2013/0177043 A1* | 7/2013 | Wyper et al. | 375/132 |

\* cited by examiner

REDUCING RECEIVER PERFORMANCE DEGRADATION DUE TO FREQUENCY COEXISTENCE

TECHNICAL FIELD

The technical field of the present disclosure relates to wireless communications, and in particular, to reducing receiver performance degradation in frequency coexistence scenarios.

BACKGROUND

Near field communications (NFC) can refer to certain standards for mobile devices, e.g., mobile telephones and similar devices, that allow radio communication to be established between the mobile device and another device, such as another mobile device, an NFC reader, such as a payment kiosk, etc. by touching or bringing the mobile device into close proximity with the other device. Accordingly, NFC/NFC enabled devices are generally required to be present within a relatively small distance from one another so that their corresponding magnetic fields can exchange information. Ranges of up to several centimeters (generally a maximum of 1 meter) are common for NFC devices. For example, a first NFC device may transmit or generate a magnetic field modulated with the information to be exchanged, such as, e.g., credit information for payment in a contactless financial transaction, or ticket fare information in an electronic ticketing transaction. This magnetic field generated or transmitted by the first NFC device may inductively couple onto a second NFC device that is proximate to the first NFC device. The second NFC device may respond to the first NFC device by transmitting or generating its own modulated magnetic field and inductively coupling this magnetic field to the first NFC device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

As previously described, NFC devices that are proximate to each other may establish radio communications by way of inductive coupling. An NFC communicator can refer to a type of NFC device that is capable of operating in an initiator mode to initiate a communication with another NFC device. The other NFC device, if operative in a target mode, can respond to the initiation of the communication by the NFC device. It should be noted that the term "NFC device" or "NFC enabled device" as utilized herein may include, not only the NFC device acting as an NFC communicator, but also other NFC enabled devices capable of initiating communications, such as, e.g., a radio frequency identification (RFID) transceiver or reader capable of initiating a near field RF communication and/or an RFID transponder or tag that are capable of responding to initiation of communication by another NFC enabled device to provide some examples. Hence, the NFC communicator can act as both an RFID transceiver and an RFID transponder, and is able to communicate with other NFC communicators, RFID transceivers and RFID transponders, etc. Moreover, it should be noted that the term NFC enabled device can refer to a host device, such as a mobile telephone or other device in which an NFC device can be implemented as will be described in greater detail below.

NFC devices, as alluded to above, may be integrated into mobile devices, such as mobile telephones to provide an example, to facilitate the use of these mobile devices in conducting, e.g., financial transactions. For example, instead of carrying numerous credit cards, the credit information provided by these credit cards may be stored onto an NFC device. The NFC device may simply be tapped to, e.g., a credit card terminal to relay the credit information thereto in order to complete a transaction. As another example, a ticket writing system, such as those used in bus and train terminals, may simply write ticket fare information onto the NFC device instead of providing a physical, e.g., paper, ticket to a passenger. The passenger may then simply tap the NFC device to an NFC reader to gain access to the bus or train.

Figure 1:
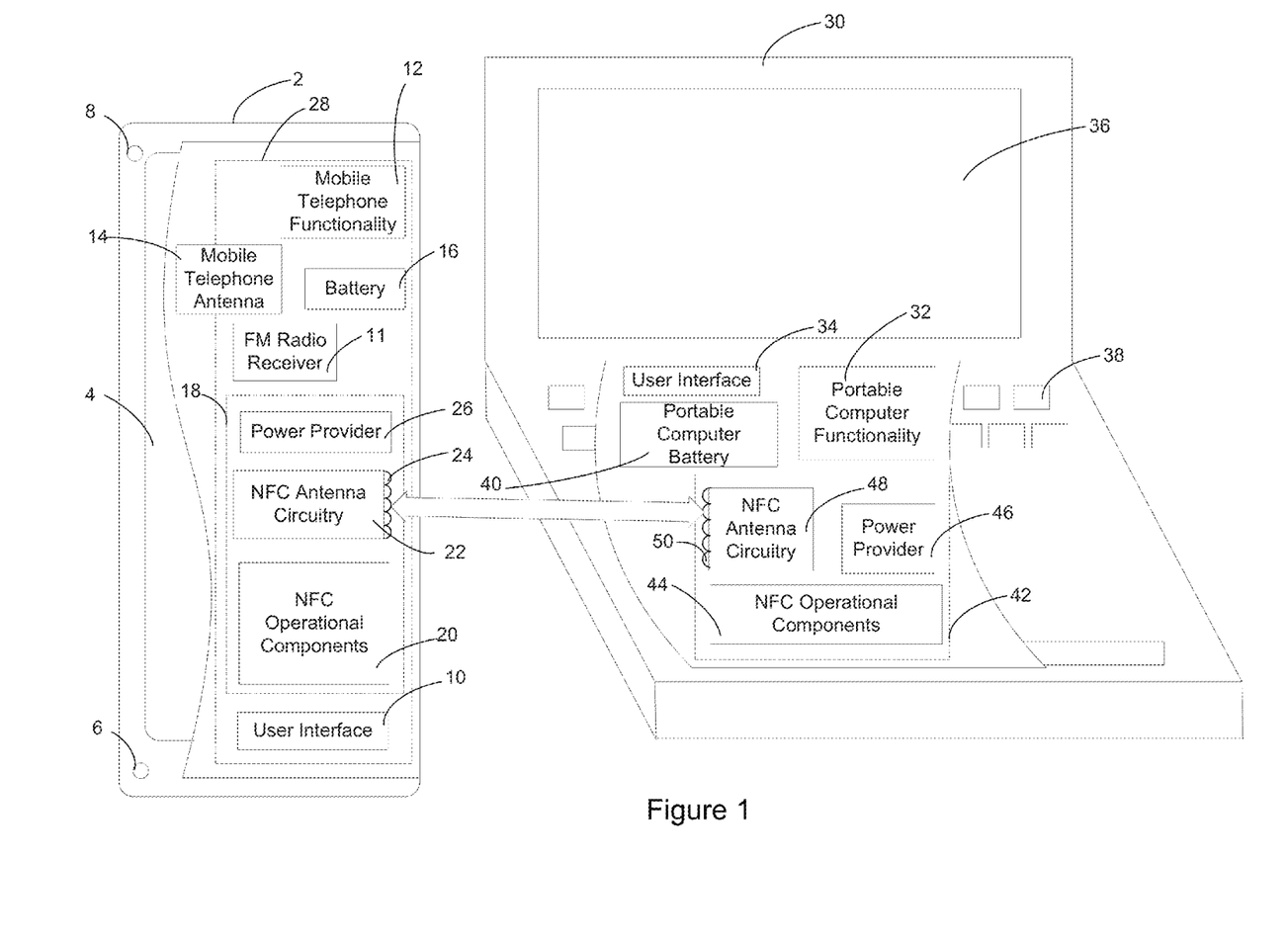
FIG. 1 illustrates a communication between two NFC enabled devices.

FIG. 1 illustrates an example communication between two NFC enabled devices, where the representations of the two NFC devices have been shown partly cut-away, and functionalities/features provided by these NFC devices are illustrated by way of a functional block diagram within each of the NFC devices. It should be noted that more or less functionalities/features may be implemented/operative in the NFC devices, and certain functionalities/features may be implemented by separate elements or components, or combinations thereof.

As shown in FIG. 1, a first NFC enabled device may be represented by a mobile telephone 2 and a second NFC enabled device may be represented by a portable computer 30, such as a notebook or laptop computer to provide some examples. However, these examples are not limiting, and it should be noted that the first and the second NFC enabled devices may be representative of a variety of any suitable NFC capable devices such as personal digital assistants, tablet computers, desktop computers, computer peripherals such as printers, portable audio and/or video players, payment systems, or ticketing writing systems to provide some examples. In the case of ticket reading systems, further examples of NFC enabled devices may include, but are not limited to toys, games, posters, packaging, advertising materials, product inventory checking systems and/or any other suitable electronic device that will be apparent to those skilled in the relevant art(s) without departing from the spirit and scope of the invention. As another possibility, the first and the second NFC enabled devices may be included within or coupled to a peripheral device, such as a smart card, electronic dongle, or other secure element, which may be a standalone device or included within or intended to be inserted into another electrical device. For example a SIM card (not shown) for use in the mobile telephone 2 may be one example of an NFC enabled device.

The mobile telephone 2 may have mobile telephony features, including, for example, mobile telephone functionality 12 for controlling operation of the mobile telephone 2 and effectuating mobile telephone communications, a mobile telephone antenna/antenna module 14 for enabling connection to one or more mobile telecommunications networks, and a user interface 10 with a display 4, a microphone 6, and a loudspeaker 8. The mobile telephone 2 may also have a battery 16 for powering one or more mobile telephone functions. Additionally, mobile telephone 2 may have an FM radio receiver 11 that may be used to receive and/or transmit signals in the FM frequency band. It should be noted that the mobile telephone 2 may have more or less functionalities/features as well as components/elements, and certain functionalities/features may be implemented by the components/elements, separately, or in one or more combinations with each other.

Similarly, portable computer 30 may have features of a portable computer including portable computer functionality 32 such as a processor with associated memory such as ROM, RAM and/or hard disk drive, one or more removable media drives such as a floppy disk drive and/or a CDROM or DVD drive, and/or a communications device(s) for enabling the portable computer 30 to connect to one or more networks. The portable computer 2 may also include a user interface 34 including a display 36, a keyboard 38, etc. The portable computer 30 may further have a battery 40.

The mobile telephone functionality 12 and the portable computer functionality 32 may further include a long range communicator to transmit or receive signals in one or more of the following frequency bands: 75-130 MHz (the FM frequency band) via the FM radio receiver 11 for example; or 0.75 to 1.0 GHz (the lower cellular phone signal band), 1.75 GHz to 2 GHz, (the upper cellular signal band), and 2.3 GHz to 2.5 GHz (the Bluetooth™ and Wi-Fi band) via, e.g., the mobile telephone functionality 12 and mobile telephone antenna 14, to provide some examples.

In addition, the mobile telephone 2 and the portable computer 30 can include NFC communicators 18 and 42, respectively. The NFC communicators 18 and 42 can be incorporated within the mobile telephone 2 and the portable computer 30, respectively, and as with the other functional blocks, may be discrete entities within the mobile telephone 2 or the portable computer 30, or alternatively, may be provided by features dispersed throughout or integrated within one or more parts of the mobile telephone 2 or the portable computer 30.

The NFC communicators 18 and 42 can include NFC operational components 20 and 44, respectively, for, as will be described below, enabling control of the NFC functionality and generation, modulation, and demodulation of a communications signal. The NFC communicators 18 and 42 can also include antenna circuits 22 and 48, respectively. The antenna circuits 22 and 48 can include respective inductive coupling elements, such as an inductor or coil to provide some examples, in the form of an antenna 24 and 50, respectively.

The NFC communicators 18 and 42 may interact with each other to exchange information such as data and/or one or more commands, as previously described. The NFC communicators 18 and 42 may be configured to operate according to an active communications mode and/or a passive communications mode. For example, NFC operational components 20 of the mobile telephone 2 may modulate its corresponding information onto a first carrier wave, referred to as a modulated carrier wave, and generate a first magnetic field by applying the modulated carrier wave to the antenna 24. The NFC operational components 20 may cease to generate the first magnetic field after transferring the information to the NFC communicator 42 of portable computer 30, wherein the NFC communicator 42 may be in the active communications mode. Alternatively, in the passive communications mode, the NFC operational components 20 can continue to apply the first carrier wave without the corresponding information to the antenna 24, referred to as an unmodulated carrier wave, once the information has been transferred to the NFC communicator 42.

It should be noted that, as previously discussed, the NFC communicators 18 and 42 require proximity to each other to effectuate communications. Accordingly, FIG. 1 illustrates antenna 24 as being sufficiently proximate to the antenna 50 such that a communication from the NFC communicator 18 can be inductively coupled onto the antenna 50. The NFC operational components 44 of portable computer 30 may demodulate the communication from the NFC communicator 18 to recover the corresponding information modulated and sent by the NFC communicator 18. The NFC operational components 44 may respond to the received information by modulating its own corresponding information onto a second carrier wave and generating a second magnetic field by applying this modulated carrier wave to the antenna 50 while the NFC operational components 44 are the active communications mode. Alternatively, the NFC operational components 44 may respond to the received information by modulating the first carrier wave that is inductively coupled onto the antenna 50 with its own corresponding information while in the passive communications mode.

The NFC communicators 18 and 42 are coupled to the mobile telephone functionality 12 and the portable computer functionality 32, respectively, to enable data and/or control commands to be sent between NFC communicator 18/mobile telephone 2 and NFC communicator 42/portable computer 30, and to enable user input to these NFC communicators. Communication between the user interface 10 of the portable telephone 2 or the user interface 34 of the portable computer 30 and either of the NFC communicators 18 or 42 may be performed via the mobile telephone functionality 12 or the portable computer functionality 32, respectively.

The NFC communicators 18 and 42 may also include respective power providers 26 and 46. The power providers 26 and 46 may represent power supplies within the mobile telephone 2 or the portable computer 30 or power supplies specific to the NFC communicators 18 and 42. The power providers 26 and 46 may include a coupling (not shown) to derive power from the respective device batteries, i.e., batteries 16 or 40. The power providers 26 and 46 may also harvest power from a communications signal to adequately operate their respective NFC communicators 18 and 42.

It should be noted that the various modules/functionalities described above might include circuitry, various electronic devices, and/or logic components, some or all of which may be implemented on a printed circuit board (PCB) or similar construct, e.g., PCB 28 of mobile telephone 2. With regard to the FM radio receiver 11 (or any other like element, for example, the mobile telephone 2 may include an amplitude modulation (AM) radio receiver instead or in addition to the FM radio receiver 11), a ground plane of the PCB 28 may be utilized by the FM radio receiver 11 as an antenna. Additionally or as an alternative, one or more wires of wired headphones used in conjunction with the mobile telephone 2 may act as or have embedded therein, an antenna element that can be utilized by the FM radio receiver 11 to receive FM signals, e.g., broadcast FM radio signals.

Figure 2:
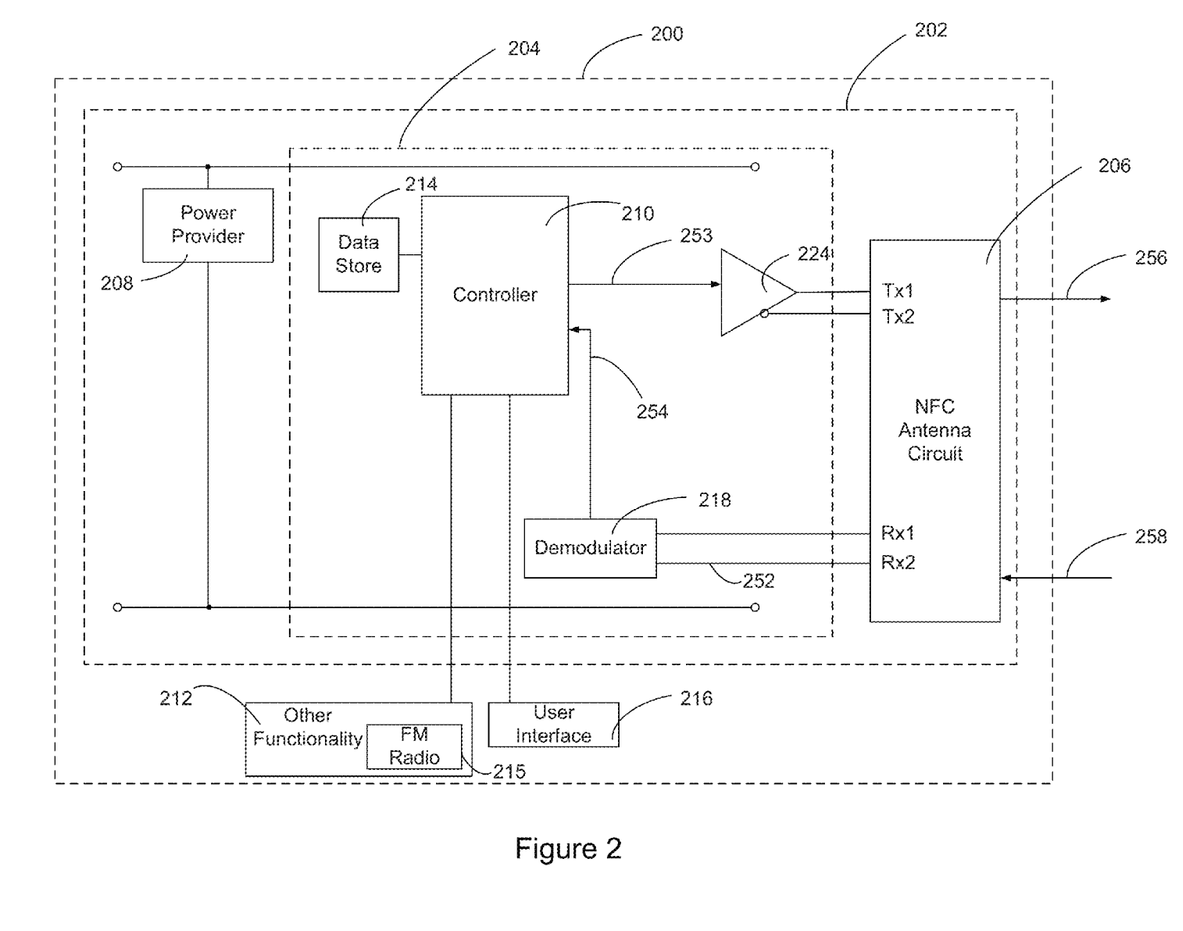
FIG. 2 illustrates a block diagram of a NFC device that may implemented as part of one of the NFC enabled devices.

FIG. 2 illustrates a block diagram of an NFC device that may implemented as part of an NFC enabled device. An NFC enabled device 200 may represent an exemplary embodiment of one of the NFC enabled devices illustrated in FIG. 1 and described above, i.e., mobile telephone 2 and/or portable computer 30. The NFC enabled device 200 may include a near field (e.g., NFC) communicator 202 that can itself include near field operational components 204, an antenna circuit 206, and a power provider 208. Although the antenna circuit 206 is illustrated as part of the near field communicator 202, it should be understood that this depiction of antenna circuit 206 is for illustrative purposes only and other arrangements are contemplated. For example, the antenna circuit 206 may be external to the near field communicator 202 and can be carried by the NFC enabled device 200. In addition, the near field communicator 202 and/or the antenna circuit 206 may include one or more interface circuits coupling one or more transmit pins, such as Tx1 and/or Tx2, and/or one or more receive pins, such as Rx1 and/or Rx2, to the antenna circuit 206.

The near field operational components 204 can include a controller 210 to control overall operation of the near field communicator 202, or alternatively, overall operation of the near field communicator 202 may be shared with the NFC enabled device 200, for example through other functionality 212, and the controller 210. In such circumstances, all or part of the control of the near field communicator 202 may be provided by the other functionality 212. For example the controller 210 may control modulation and modulation protocols whereas the data to be transmitted may be provided by the other functionality 212. It should be noted that the other functionality 212 may include FM radio functionality 215, which in accordance with one example, can be effectuated in part, by an FM radio receiver, such as FM radio receiver 11 of FIG. 1.

The controller 210 may be coupled to a data store 214 for storing information, such as one or more commands and/or data that is to be transmitted from and/or data that can be received by the NFC enabled device 200. The near field operational components 204 may additionally be connected or coupled with at least one of the other functionality 212, such as the mobile telephone functionality 12 of FIG. 1, and a user interface 216, such as the user interface 10 of FIG. 1. The controller 210 may receive the information from the other functionality 212, the data store 214, and/or the user interface 216, and/or provide the information to the other functionality 212, the data store 214, and/or the user interface 216. The controller 210 may be implemented using a microprocessor, such a RISC processor or any other suitable microprocessor or a state machine. Program instructions for programming the controller 210 and/or the information may be stored in an internal memory of the controller and/or received via the other functionality 212, the data store 214 and/or the user interface 216.

The near field operational components 204 may recover information, such as one or more commands and/or data, which can be transferred from another NFC enabled device. As shown in FIG. 2, the near field operational components 204 can also include a demodulator 218 to demodulate a recovered communication signal 252 and/or to provide recovered information 254. The demodulator 218 can demodulate the recovered communication signal 252 to recover information, such as one or more commands and/or data, using any suitable analog or digital modulation technique such as AM, FM, phase modulation (PM), phase shift keying (PSK), frequency shift keying (FSK), amplitude shift keying (ASK), quadrature amplitude modulation (QAM) and/or any other suitable modulation technique.

The recovered information 254 may include one or more commands and/or data. The controller 210 may issue and/or execute the one or more commands to control the overall operation and/or configuration of the NFC enabled device 200. For example, the controller 210 may issue and/or execute commands to control operations of the NFC enabled device 200, as well as other NFC enabled devices, such as a transmission power, a transmission data rate, a transmission frequency, a modulation scheme, a bit and/or a byte encoding scheme and/or any other suitable operation parameter. As another example, the controller 210 may format the recovered information 254 into a suitable format for transmission to the other functionality 212, the data store 214, and/or the user interface 216 and may perform error decoding, such as cyclic redundancy check (CRC) decoding to provide an example, on the recovered information 254.

The near field operational components 204 may transfer information, such as one or more commands and/or data, to another NFC enabled device. The controller module 210 may modulate information received from the other functionality 212, the data store 214, and/or the user interface 216 onto a carrier wave to provide a modulated communication as transmission information 253. The controller module 210 may modulate the information using any suitable analog or digital modulation technique such as AM, FM, PM, PSK, FSK, ASK, QAM and/or any other suitable modulation technique. Alternatively, the controller module 210 may simply provide the carrier wave without the information to provide an unmodulated communication as the transmission information 253.

As illustrated in FIG. 2, the near field operational components 204 may further include a driver 224 to amplify the transmission information 253. It should be noted that the driver 224 can be optional, thereby allowing the transmission information 253 to load modulate a magnetic field of another NFC capable device that is inductively coupled onto the antenna circuit 206. For example, a separate signal generator (not shown) that operates under the control of the controller 210 may be configured to provide a carrier wave. In this example, the driver 224 can gate or switch the carrier wave in accordance with the information to provide the transmission information 253.

The controller 210 may issue and/or execute commands to cause the NFC enabled device 200 to operate in an initiator mode of operation to initiate a communication and/or a target mode of operation to respond to a communication. The mode of operation may be determined by the controller 210 or may be determined depending on the nature of any communications signal that may be inductively coupled to the antenna circuit 206. When in the initiator mode of operation, the controller 210 causes the NFC enabled device 200 to initiate communications with another NFC enabled device, such as another NFC communicator in target mode, an RFID tag, and/or transponder to provide some examples, that is sufficiently proximate. While in target mode of operation, the NFC enabled device 200 may wait for a communication from another NFC enabled device initiating a communication, such as an NFC communicator, an RFID initiator, and/or a transceiver to provide some examples. Typically, the other NFC enabled device is operable at the same frequency and in accordance with the same protocols, for example in accordance with the protocols as those utilized by the NFC enabled device 200.

When in the initiator or target mode of operation, the near field operational components 204 may communicate in accordance with an active or a passive protocol. When using the active protocol, the NFC enabled device 200 can modulate the information onto the carrier wave and apply this modulated carrier wave to the antenna circuit 206 to provide a transmitted communication signal 256. Following the transfer of the information to another NFC enabled device, the NFC enabled device 200 may cease to provide the transmitted communication signal 256. However, the NFC enabled device 200 can continue to apply the carrier wave without any information to the antenna circuit 206 to maintain the transmitted communication signal 256 when using the passive protocol.

When the NFC enabled device 200 is operating using the active protocol, another NFC enabled device can respond to the information by modulating its response with its corresponding carrier wave. The other NFC enabled device can apply this modulated carrier wave to its corresponding antenna to generate another magnetic field to inductively couple its response onto the antenna circuit 206. However, the other NFC enabled device may modulate the magnetic field generated by the NFC enabled device 200 with its corresponding information to inductively couple its response onto the antenna circuit 206 when the NFC enabled device 200 is operating using the passive protocol. The protocol being used by the NFC enabled device 200 may depend on instructions received from the controller 210 and/or the response received from other NFC enabled device.

The antenna circuit 206 may be implemented as a single-ended circuit with one transmit output and one receive input or a double-ended circuit having two transmit outputs and two receive inputs, or may be single-ended for one of receive and transmit and double-ended for the other. For example, as shown in FIG. 2, the antenna circuit 206 may represent a double-ended antenna circuit including two transmit outputs Tx1 and Tx2 and two receive inputs Rx1 and Rx2. The antenna circuit 206 may apply the transmission information 253 to an inductive coupling element, such as an inductor or coil to provide examples, to generate the magnetic field to provide the transmitted communication signal 256. Typically, the inductive coupling element is optimized or tuned to a particular frequency, or range of frequencies, commonly referred to as its resonant frequency.

That is, resonant inductive coupling can refer to the near field wireless transmission of electrical energy between inductive coupling elements, e.g., two coils that are tuned to resonate at the same or very similar frequency. In practice, NFC enabled device 200 (in the initiator mode) can apply an oscillating current to a coil, e.g., antenna 24, to create an oscillating magnetic field. The other NFC enabled device, e.g., portable computer 30 (in target mode and with its own respective coil, e.g., antenna 50, resonating at the same or similar frequency as the oscillating magnetic field that is placed in the oscillating magnetic field near the NFC enabled device 200) can couple with the NFC enabled device 200 picking up energy and/or information from the oscillating magnetic field.

Alternatively, the antenna circuit 206 may apply the transmission information 253 to modulate a magnetic field of another NFC enabled device that is inductively coupled onto the antenna circuit 206. Additionally, another NFC enabled device may modulate its information onto its corresponding carrier wave and apply this modulated carrier wave to its corresponding antenna circuit to generate its corresponding magnetic field to inductively couple a received communications signal 258 onto the inductive coupling element to provide the recovered communication signal 252. Alternatively, another NFC enabled device may modulate the magnetic field of the NFC enabled device 200 that is inductively coupled onto its corresponding antenna circuit with the received communications signal 258 to provide the recovered communication signal 252.

A power provider 208 may harvest a power source from the recovered communications signal 252. The power source may include sufficient power to adequately operate the near field communicator 202.

As described above, an NFC enabled device, such as a mobile phone or portable computer may have both NFC functionality for engaging in NFC communications as well as FM radio functionality for, e.g., receiving and listening to, e.g., broadcast FM radio signals. That is, and for example, an NFC enabled device may have an FM receiver for receiving FM signals, in addition to an NFC transceiver that can be used to transmit and receive NFC signals. As described above and illustrated in FIG. 1, the mobile telephone 2 may have an FM receiver 11 that utilizes, e.g., the ground plane of PCB 28 as an antenna for receiving FM signals. An exemplary FM radio frequency band utilized in most of the world may comprise a range of frequencies from about 76 MHz to about 108 MHz. Simultaneously, the NFC antenna circuitry 22 and antenna 24 can be utilized for, e.g., receiving an NFC modulated or unmodulated carrier wave from NFC antenna circuitry 48 and antenna 50 of the portable computer 30 of FIG. 1. An exemplary frequency utilized for NFC signals is about 13.56 MHz. It should be noted that various embodiments contemplate the use of, e.g., a single antenna utilized for the transmission and/or receipt of both FM signals and NFC communications, instead of relying on separate antennas/antenna modules/antenna circuitry.

Figure 3:
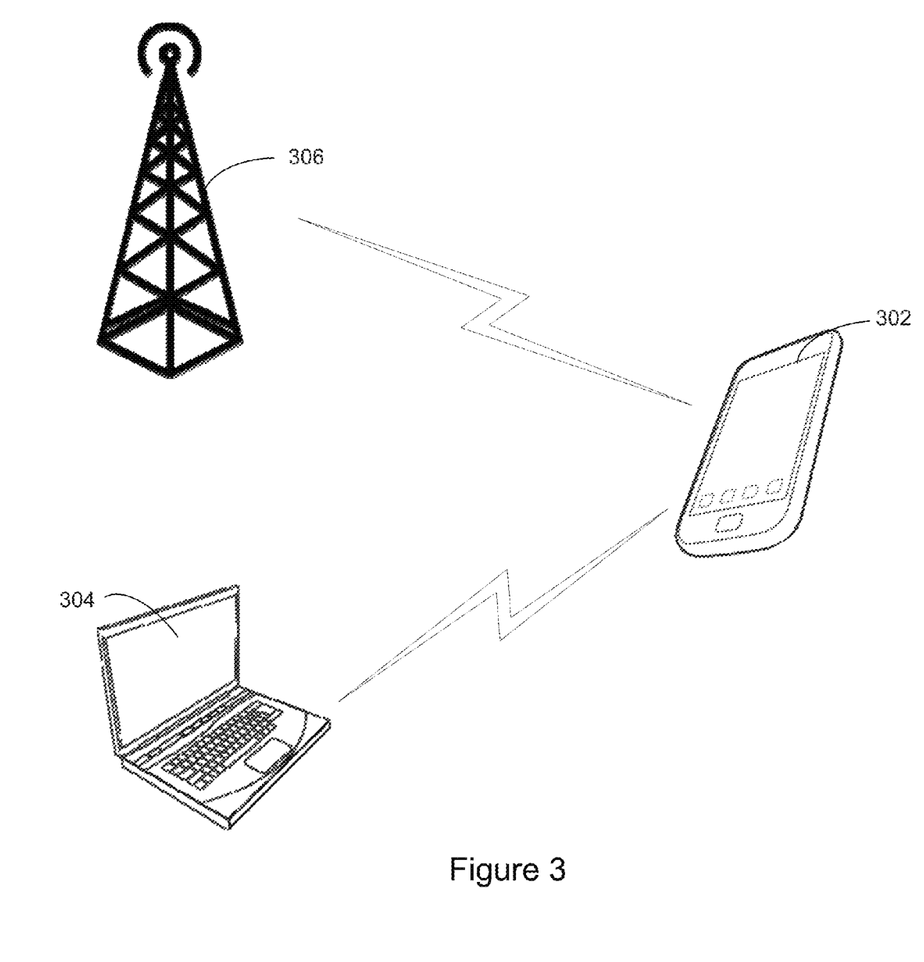
FIG. 3 illustrates an example of NFC and FM coexistent communications.

FIG. 3 is a diagram illustrating example FM and NFC communications, in which various embodiments may be utilized. Referring to FIG. 3, a first NFC enabled device, e.g., a mobile telephone 302 is shown to be engaged in NFC communications with a second NFC enabled device, e.g., a portable computer 304. Simultaneously with/during engaging in NFC communications, the mobile telephone 302 may also be receiving FM signals that are being broadcast from an antenna tower 306, such as an FM broadcast radio station antenna tower. Hence, the mobile telephone 302 and the portable computer 304 may communicate via signals within the NFC frequency band, while the mobile telephone 302 and the antenna tower 306 may communicate via signals within the FM frequency band.

As previously described, when an NFC enabled device, such as mobile telephone 302, receives data via signals within the NFC frequency band, it may detect electromagnetic energy that corresponds to an electromagnetic field within its proximate vicinity, e.g., an electromagnetic field generated by portable computer 304. For example, the portable computer 304 may generate a signal based on the data to be transmitted (e.g., a modulated carrier wave) which, when transmitted via an antenna, may cause variations in the generated electromagnetic field. The mobile telephone 302 may detect the variations in the electromagnetic field that may enable the mobile telephone 302 to receive the data transmitted by the portable computer 304. With regard to receiving signals within the FM frequency band, the mobile telephone 302 may receive RF signals within the FM frequency band, where the RF signals may be received an FM antenna of the mobile telephone 302, e.g., the ground plane of a PCB or headphones connectable to the mobile telephone 302.

Figure 4:
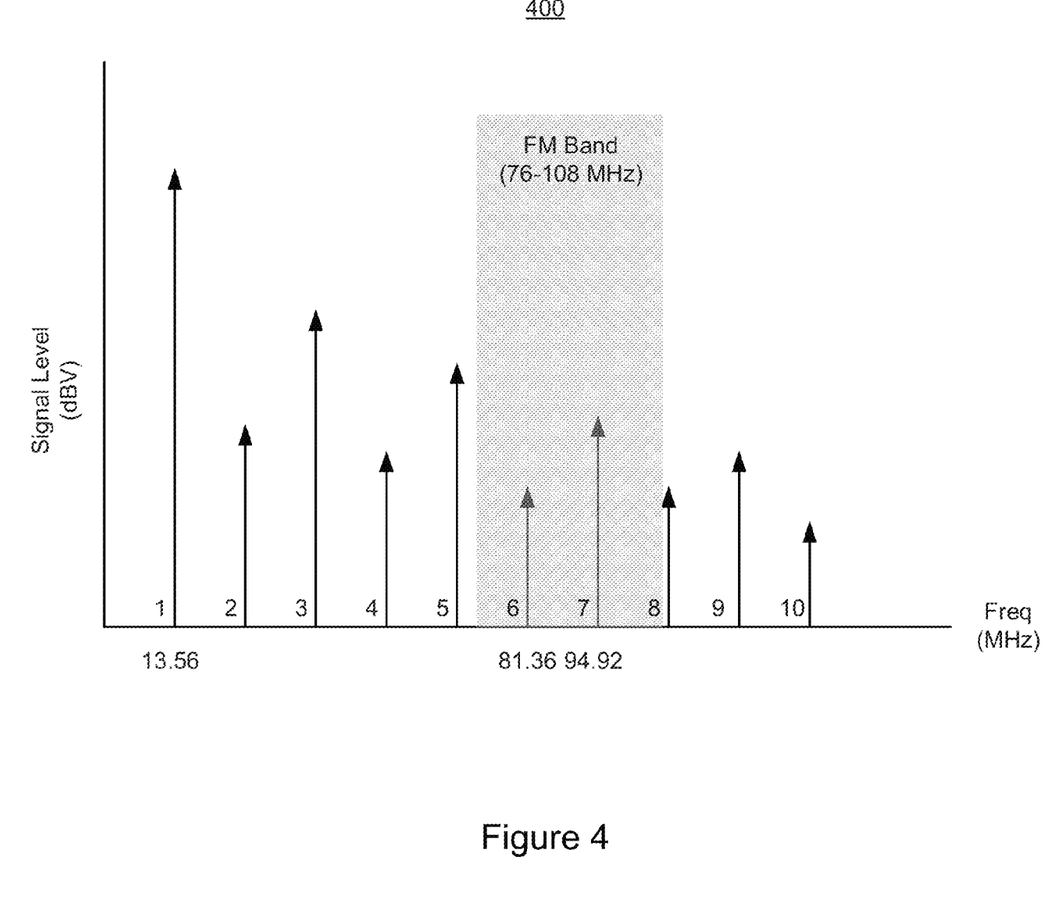
FIG. 4 illustrates example coexistent NFC and FM frequencies.

A phenomenon commonly referred to as harmonic coupling can occur at, e.g., the $6^{th}$ and $7^{th}$ harmonics of the NFC signal frequency which can result in FM channel blocking at 81.36 MHz and 94.92 MHz, where a harmonic can refer to a wave that is a component frequency of a signal that is an integer multiple of the fundamental frequency (or lowest frequency of a periodic waveform/signal). That is, the $6^{th}$ and $7^{th}$ harmonics of the NFC signal frequency, 81.36 MHz (13.56 MHz×6) AND 94.92 (13.56 MHz×7), respectively, fall within the FM radio frequency band (e.g., 76 MHz to about 108 MHz). FIG. 4 illustrates an example graph plotting signal level in decibel-volts (dBV) of an NFC signal and frequency in MHz. As shown, the fundamental frequency of the NFC signal can be 13.56 MHz, with ten harmonics, the $6^{th}$ and $7^{th}$ harmonics falling within the FM frequency band. Accordingly, the NFC signal may be "heard" by an FM receiver, thereby interfering or causing channel blocking of the FM signals at those FM frequencies. To negate or at least alleviate the issues of channel blocking at the $6^{th}$ and $7^{th}$ harmonics, a notch filter (which can tend to be expensive components) may be added to work in conjunction with the NFC inductive element, e.g., coil or antenna, as well as utilizing spurious tone/spur removal techniques on the FM signal.

However, and unaddressed in conventional systems, fundamental coupling may also occur with the coexistence of NFC and FM technologies. That is, an NFC antenna, such as that which would transmit the aforementioned signal during NFC communication between mobile telephone 302 and portable computer 304 may transmit relatively strong signals (the carrier, as mentioned above, being at, e.g., 13.56 MHz). Hence, the relatively strong NFC signal being transmitted at 13.56 MHz to an NFC enabled device that may also have an FM receiver can interfere with the RF signals being received within the FM frequency band by the FM receiver. In particular, the 13.56 MHz NFC signal can mix with one or more FM blockers/blocking signals 13.56 MHz away from the desired/tune-to FM frequency. As utilized herein, the term blocker or blocking signal can refer to any out-of-band or otherwise undesirable signal that can cause some form of interference. For example, a relatively large or strong NFC signal can be a blocker. Alternatively or in addition to the NFC signal, a strong signal associated with another FM frequency may also be a blocker, as is the combination of an FM signal and an NFC signal as alluded to above. Further still, the NFC antenna of an NFC enable device may engage in polling in an attempt to receive NFC communications, which again, may be heard.

Such interference can cause a decrease in signal to noise ratio (SNR), where SNR can refer to a measure for comparing the level of a desired signal to the level of background noise. An SNR higher than 1:1, for example, is indicative that the signal power is greater than the noise power. Accordingly, and due to the aforementioned fundamental coupling, the SNR in an NFC and FM coexistent scenario can be degraded such that noise power is increased. Another measure that can be utilized for judging the linearity of amplifiers and other RF components in a system can be referred to as intermodulation distortion (IMD). That is, an FM receiver or other elements in a system or device, such as an amplifier, can create noise and "phantom" signals to some degree that may be heard even though such phantom signals may not actually be radiated (e.g., the aforementioned blockers/blocking signals) at a desired/tune-to frequency. One source of such phantom signals can be amplifiers, where the phantom signals can be created due to IMD, where second order intercept points (IP2) can be used to characterize an RF system, such as the mobile telephone 302 of FIG. 3. Hence, and again, the aforementioned fundamental coupling can degrade FM SNR performance at the front end.

Figure 5:
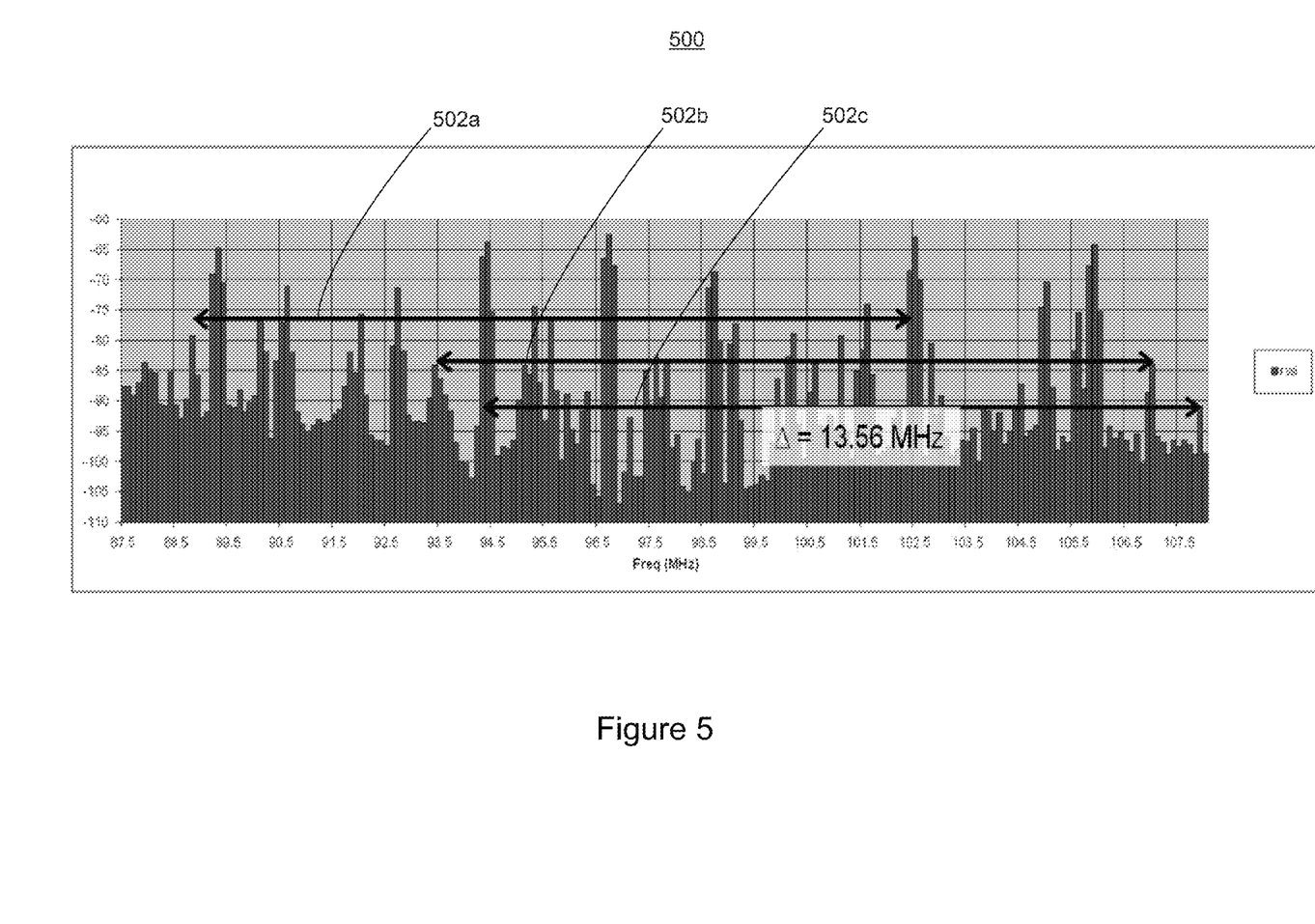
FIG. 5 illustrates example fundamental coupling in NFC and FM coexistent communications.

FIG. 5 illustrates the aforementioned fundamental coupling issue that can occur when NFC and FM technologies coexist, where a graph 500 plots received signal strength indication (RSSI) (i.e., the power present in a received radio signal) against frequency. As shown in FIG. 5, fundamental coupling can occur whereby a strong NFC signal at 13.56 MHz can mix with an FM blocker 13.56 MHz away from a desired FM frequency. For example, and as indicated by arrow 502a, at 102.5 MHz, an NFC signal 13.56 MHz away from, e.g., an FM frequency of approximately 89 MHz, the NFC signal can mix with an FM blocker causing signal degradation. As indicated by arrow 502b, as another example, an NFC signal can mix with an FM blocker at 107 MHz causing signal degradation at an FM frequency of approximately 93.5 MHz. As indicated by arrow 502c, as yet another example, an NFC signal may, e.g., add, to an FM blocker at 108 MHz, causing interference at approximately 94.5 MHz.

It should be noted that signal degradation/interference can occur at 13.56 MHz in either direction of a desired/tuned-to FM frequency. Referring back to FIG. 5, and as indicated by arrow 502a, an NFC signal can mix with an FM blocking signal at, e.g., 89 MHz, causing signal degradation at approximately 102.5 MHz. Similarly, and as indicated by arrow 502b, an NFC signal can mix with an FM blocking signal at 93.5 MHz, causing signal degradation at approximately 107 MHz. Again, and as indicated by arrow 502c, an NFC signal can mix with an FM blocking signal at 94.5 MHz, causing degradation at approximately 108 MHz.

It should further be noted that any blocker(s)/blocking signal(s) can mix together and introduce some interference. In scenarios where NFC signals are not coexistent with FM signals, this mixing is not generally an issue as FM receivers are generally configured to have high blocker performance. Moreover, and without the existence of such blockers/blocking signals, coexistence between FM and NFC would not generally pose an issue. However, because NFC signals can be relatively large (as previously discussed), e.g., on the order of 40-50 dB greater than, e.g., an FM blocking signal, the addition of the NFC signal can be significant, again, hampering blocker performance and causing signal degradation, where partial or even total blocking of a desired/tuned-to FM frequency or channel can result.

As previously described, an FM radio receiver, such as FM radio receiver 11 of FIG. 1 may utilize a headset or the ground plane of a PCB, such as PCB 28, as an antenna for receiving FM signals. As also previously described, when an FM radio receiver is implemented in an NFC enabled device, NFC signals received from another NFC enabled device can result in fundamental coupling, where the fundamental coupling can occur through the headset or ground plane of the PCB, or even through the PCB (or other PCBs) itself.

Figure 6:
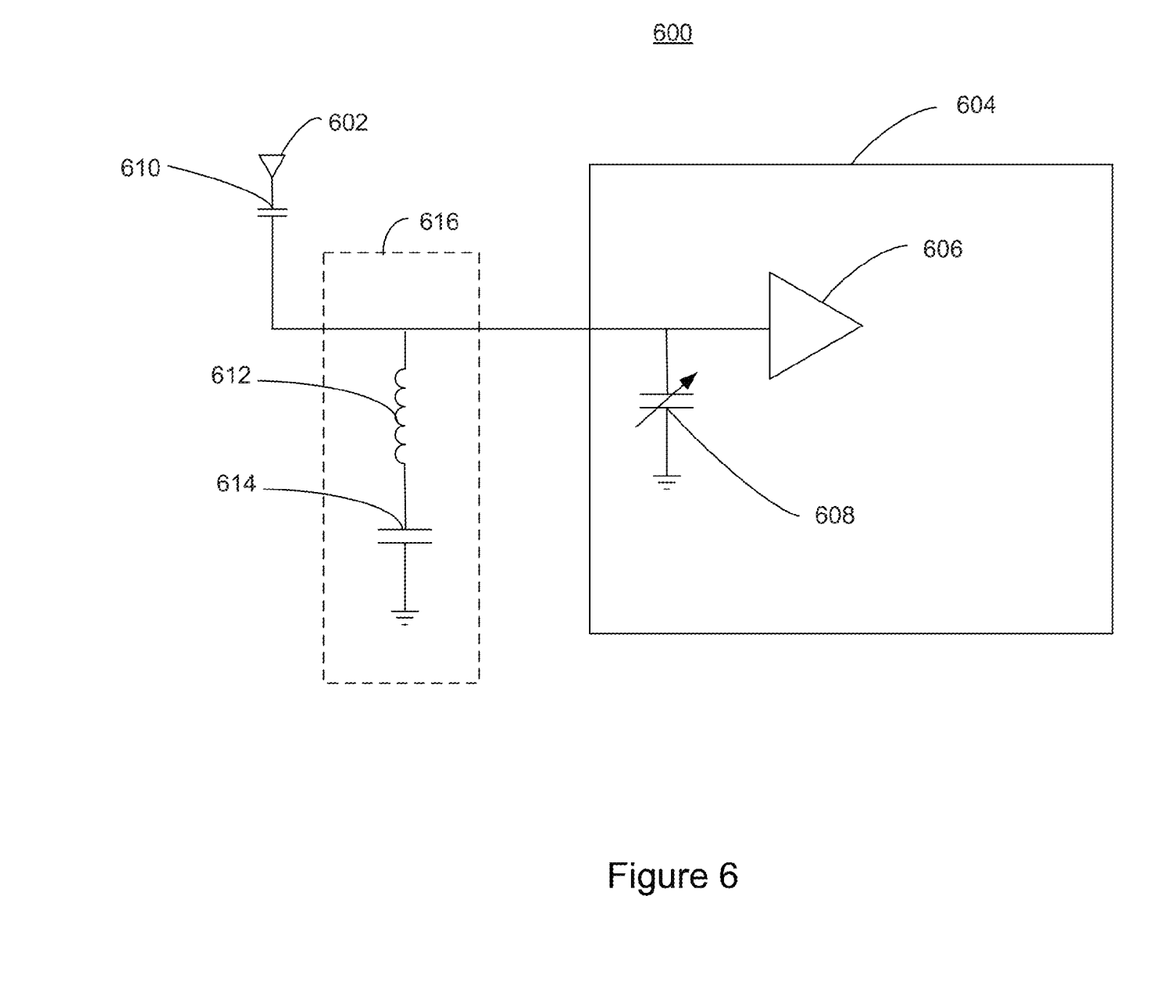
FIG. 6 illustrates an example LC notch filter utilized in an FM receiver front end in accordance with various embodiments.

To negate such fundamental coupling, a resonant, e.g., LC notch, filter can be integrated at the front end input of the FM signal to avoid the occurrence of fundamental coupling. FIG. 6 illustrates example circuitry employing such an LC notch filter in accordance with various embodiments. FIG. 6 shows an FM radio receiver front end 600 that can include an FM antenna 602, which again, can be, e.g., a headset, the ground plane of a PCB, etc. connected to an integrated circuit (IC) 604 that may include a low noise amplifier 606 and an on-chip tuning/variable capacitor 608. The on-chip tuning capacitor 608 can be utilized to tune the FM radio receiver to a desired FM frequency or channel. While optional, a capacitor 610 is also shown to be connected between the FM antenna 602 and low noise amplifier 606. Capacitor 610 can be utilized to lower the capacitance of the FM antenna 602, which can allow LNA tuning inductor 612 to be tuned to certain higher FM frequencies if desired. In accordance with various embodiments, another capacitor 614 may be added to the FM radio receiver front end 600, which in conjunction with the LNA tuning inductor 612, can create an LC notch filter 616.

The addition of the capacitor 614 to create the LC notch 616 allows for the ability to tune the FM antenna 602 to a desired FM frequency or channel via, e.g., on-chip tuning capacitor 608 and/or capacitor 610, and filter out the blockers/blocking signals, e.g., NFC signals at 13.56 MHz via LC notch filter 616 which includes capacitor 614. Contrary to conventional methods of filter design, it would be difficult to design a conventional filter to filter out the blockers/blocking signals, as the fundamental coupling described herein does not merely relate to a controlled impedance problem. That is, an NFC antenna transmitting NFC signals is difficult to match, and therefore filtering out the signals transmitted from the NFC antenna would similarly be difficult to accomplish. For example, and in an FM radio receiver front end, the addition of capacitor 614 can result in, e.g., a 10 dB improvement in SNR for a signal versus an FM radio receiver front end that does not employ the capacitor 614 for the same signal.

Although various embodiments disclosed herein are described in terms of NFC devices and NFC enabled devices, other contemplated embodiments may be applicable to other communications that use the near field and/or the far field technology without departing from the spirit and scope of the present invention. Furthermore, fundamental coupling can occur in NFC devices/NFC enabled devices utilizing, e.g., a shared antenna, where a single antenna may be utilized for FM and NFC transceiving functions. Accordingly, various embodiments contemplated herein can be applied to such devices as well. Moreover, various embodiments can be adapted, e.g., by moving/tuning the LC notch filter to filter out any other undesirable or out-of-band interference besides 13.56 MHz, and the interference may occur for signals in frequency bands other than the FM frequency band.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term functionality/module can describe a given unit of functionality that can be performed in accordance with one or more embodiments. As used herein, a functionality/module may be implemented utilizing any form of hardware, software, or a combination thereof. For example, one or more processors, controllers, ASICs, PLAs, PALs, CPLDs, FPGAs, logical components, software routines or other mechanisms might be implemented to make up a module/functionality. In implementation, the various modules/functionalities described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules/functionalities in various combinations and permutations. Even though various features or elements of functionality may be individually described or claimed as being separate, it should be understood that these features and functionality can be shared among one or more common software and hardware elements, and such description shall not require or imply that separate hardware or software components are used to implement such features or functionality. Where components or modules/functionalities of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus, comprising:
   an antenna for receiving frequency modulated (FM) signals at a first frequency;
   a tuning capacitor coupled to the antenna for lowering a capacitance of the antenna;
   a resonant filter comprising a low noise amplifier (LNA) tuning inductor coupled to a second capacitor; and
   a variable capacitor coupled to the resonant filter, wherein the resonant filter, variable capacitor, and the tuning capacitor are configured to:
      tune the antenna to desired frequencies, including the first frequency, and
      prevent in-band interference by filtering out a near-field communication (NFC) signal at a second frequency mixed with a blocking signal associated with the first frequency.

2. The apparatus of claim 1, further comprising an integrated circuit chip including the resonant filter and the LNA.

3. The apparatus of claim 1, wherein the LNA tuning inductor is coupled in parallel with the variable capacitor, and wherein the first frequency is a low frequency.

4. The apparatus of claim 1, wherein the second capacitor is coupled in series with the LNA tuning inductor, the second capacitor being configured to filter out the second frequency.

5. The apparatus of claim 4, wherein the first frequency is a high frequency.

6. The apparatus of claim 1, wherein the antenna comprises one of a headset connectable to the apparatus, a ground plane of a printed circuit board upon which at least one of circuitry for tuning and the resonant filter is implemented.

7. The apparatus of claim 1, wherein the NFC signal has a frequency value of 13.56 MHz.

8. The apparatus of claim 7, wherein the NFC signal comprises at least one of a modulated carrier wave from an NFC enabled device, an unmodulated carrier wave from the NFC enabled device, and a polling signal.

9. An apparatus, comprising:
   a near-field communication (NFC) antenna;
   a NFC transceiver for transmitting and receiving NFC signals;
   a frequency modulation (FM) antenna;
   a tuning capacitor coupled to the FM antenna for lowering a capacitance of the FM antenna;
   a front-end comprising:
      a FM receiver for receiving signals in an FM frequency band;
      a notch filter comprising a low noise amplifier (LNA) tuning inductor coupled to a second capacitor; and
      a variable capacitor coupled to the notch filter, wherein the notch filter, variable capacitor, and the tuning capacitor are configured to:
         tune the antenna to desired frequencies, including an FM frequency, and
         prevent in-band interference by filtering out the near-field communication (NFC) signal at a second frequency mixed with a blocking signal associated with the FM frequency.

10. The apparatus of claim 9, wherein the FM antenna comprises one of a headset connectable to the apparatus, a ground plane of a printed circuit board upon which circuitry for implementing at least one the NFC transceiver, the NFC antenna, the FM receiver, and the notch filter is located.

11. The apparatus of claim 9, wherein the LNA tuning inductor is coupled in series with the second capacitor.

12. The apparatus of claim 9, wherein the NFC signals have a frequency of 13.56 MHz.

13. The apparatus of claim 9, wherein the NFC signals comprise at least one of a modulated carrier wave from a NFC enabled device, an unmodulated carrier wave from the NFC enabled device, and a polling signal.

14. A system, comprising:
   a first near field communications (NFC) enabled device; and
   a second NFC enabled device, wherein the second NFC enabled device comprises:
      a NFC antenna;
      a NFC transceiver for transmitting and receiving NFC signals to and from the first NFC enabled device;
      a frequency modulation (FM) antenna;
      a tuning capacitor coupled to the FM antenna for lowering a capacitance of the FM antenna; and
      a front-end comprising:
         a FM receiver for receiving signals in an FM frequency band;
         a notch filter comprising a LNA tuning inductor coupled to a second capacitor; and
         a variable capacitor coupled to the notch filter, wherein the notch filter, variable capacitor, and the tuning capacitor are configured to:
            tune the antenna to desired frequencies, including the FM frequency, and
            prevent in-band interference by filtering out the near-field communication (NFC) signal at a second frequency mixed with a blocking signal associated with the FM frequency.

15. The system of claim 14, wherein the NFC signals comprise at least one of a modulated carrier wave from the first NFC enabled device, an unmodulated carrier wave from the first NFC enabled device, and a polling signal from the second NFC enabled device.

16. The system of claim 14, wherein the low noise amplifier tuning inductor for tuning an antenna of the FM receiver is coupled in series with the second capacitor.

* * * * *